(12) United States Patent
Beckham

(10) Patent No.: US 10,109,189 B2
(45) Date of Patent: *Oct. 23, 2018

(54) TRAFFIC SIGNALING APPARATUS

(71) Applicant: UNITED SAFETY TOWERS, LLC, Rock Hill, SC (US)

(72) Inventor: Milton Clifford Beckham, Rock Hill, SC (US)

(73) Assignee: UNITED SAFETY TOWERS, LLC, Rock Hill, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/596,274

(22) Filed: May 16, 2017

(65) Prior Publication Data

US 2017/0249837 A1 Aug. 31, 2017

Related U.S. Application Data

(63) Continuation of application No. 15/101,562, filed as application No. PCT/US2014/068501 on Dec. 4, 2014, now Pat. No. 9,685,082.

(60) Provisional application No. 61/912,292, filed on Dec. 5, 2013.

(51) Int. Cl.
*G08G 1/095* (2006.01)
*F21V 21/108* (2006.01)
*F21S 8/08* (2006.01)
*F16M 13/02* (2006.01)
*F21W 111/02* (2006.01)

(52) U.S. Cl.
CPC ............. *G08G 1/095* (2013.01); *F16M 13/02* (2013.01); *F21S 8/085* (2013.01); *F21V 21/108* (2013.01); *F21W 2111/02* (2013.01)

(58) Field of Classification Search
CPC . G08G 1/095; F16M 13/02; F21S 8/00; F21S 8/085; F21V 21/008; F21V 23/002; F21V 21/108; G06K 9/00825; H05B 37/0272
USPC .................................................. 340/907, 908
See application file for complete search history.

(56) References Cited

U.S. PATENT DOCUMENTS

| 4,543,905 A * | 10/1985 | McKenney | ............. E01F 9/696 340/908 |
| 6,262,673 B1 * | 7/2001 | Kalina | .................... G08G 1/095 340/907 |
| 2013/0285840 A1* | 10/2013 | Allen | ....................... G08G 1/07 340/923 |

(Continued)

*Primary Examiner* — Thomas Mullen
(74) *Attorney, Agent, or Firm* — John P. Zimmer; Nexsen Pruet, PLLC

(57) ABSTRACT

In one aspect, traffic signaling apparatus are described herein. In some embodiments, a traffic signaling apparatus described herein comprises a first traffic light structure and a second traffic light structure. The second traffic light structure is operable to display a plurality of traffic signals, such as a red traffic signal and a green traffic signal. Further, the second traffic light structure is attached to a horizontal or substantially horizontal cable or to a horizontal or substantially horizontal mast arm. Moreover, the first traffic light structure is attached to the second traffic light structure or to the mast arm by a pole. Additionally, in some cases, the first traffic light structure is disposed at least three feet above the second traffic light structure. The first traffic light structure can also be substantially horizontally aligned with the second traffic light structure.

7 Claims, 11 Drawing Sheets

(56) References Cited

U.S. PATENT DOCUMENTS

2013/0325241 A1* 12/2013 Lombrozo ............ B60W 40/00
                                                    701/23
2014/0247160 A1*  9/2014 Glascock ............... G08G 1/095
                                                    340/907

* cited by examiner

TRAFFIC SIGNALING APPARATUS

CROSS REFERENCE TO RELATED APPLICATIONS

This application is a continuation of, and claims priority to, U.S. patent application Ser. No. 15/101,562, filed on Jun. 3, 2016, which issued as U.S. Pat. No. 9,685,082 on Jun. 20, 2017, and which is a U.S. national stage application under 35 U.S.C. § 371 of International Application No. PCT/US2014/068501, filed on Dec. 4, 2014, which claims priority under 35 U.S.C. § 119(e) to U.S. Provisional Patent Application Ser. No. 61/912,292, filed on Dec. 5, 2013, each of which is hereby incorporated by reference in its entirety.

FIELD

This invention relates to traffic signals, and, in particular, to traffic signaling apparatus and methods of displaying traffic signals configured to improve traffic safety.

BACKGROUND

Traffic signaling apparatus such as traffic lights can be used to manage and facilitate the flow of traffic through an intersection or other area. However, in some cases, traffic signals cannot be easily seen by drivers until they are in or near the intersection itself. Traffic lights disposed above the intersection on a pole or a wire, as opposed to on the side of the roadway, may be especially difficult to see in some circumstances. For example, some drivers may have their vision impaired when approaching an intersection behind a large or tall vehicle, such as a 16- or 18-wheeler tractor-trailer vehicle, a farm vehicle, a commercial bus, a school bus, a military vehicle, a boat trailer, an automobile transport vehicle, a sport utility vehicle, or some other large or tall vehicle. As a result, a driver approaching an intersection behind a large or tall vehicle may inadvertently enter the intersection contrary to the signal presented by the traffic light, which can lead to a collision.

Therefore, there exists a need for improved traffic signaling apparatus, and methods of displaying traffic signals, that provide increased visibility of traffic signals to drivers approaching intersections, including behind a tall vehicle.

SUMMARY

In one aspect, traffic signaling apparatus are described herein which, in some embodiments, may provide one or more advantages over previous traffic signaling apparatus. For instance, in some cases, a traffic signaling apparatus described herein can be used to increase the visibility of a traffic signal in an intersection when a driver's view is at least partially obstructed by a large or tall vehicle. In addition, a traffic signaling apparatus described herein can also be simple and/or modular, permitting the facile retrofitting of existing traffic lights to improve traffic safety. Further, a traffic signaling apparatus described herein, in some instances, has an adjustable size in at least one dimension, thereby permitting the apparatus to be reversibly modified as needed for a specific intersection.

In some embodiments, a traffic signaling apparatus described herein comprises a first traffic light structure and a second traffic light structure. The second traffic light structure is operable to display a plurality of traffic signals, such as a red traffic signal and a green traffic signal. Further, the second traffic light structure is attached to a horizontal or substantially horizontal cable or to a horizontal or substantially horizontal mast arm. Moreover, the first traffic light structure is attached to the second traffic light structure or to the mast arm by a pole. Additionally, in some cases, the first traffic light structure is disposed at least three feet above the second traffic light structure. The first traffic light structure can also be substantially horizontally aligned with the second traffic light structure. In this manner, the first traffic light structure and the second traffic light structure of the apparatus can have a stacked configuration.

Further, the first traffic light structure and the second traffic light structure of an apparatus described herein can be configured to simultaneously display the same type of traffic signal. For example, in some embodiments, the first traffic light structure is operable to simultaneously display a red traffic signal displayed by the second traffic light structure. In addition, in some cases, the first traffic light structure is also operable to simultaneously display a green traffic signal displayed by the second traffic light structure. Similarly, in some embodiments, the first traffic light structure is operable to simultaneously display a yellow traffic signal displayed by the second traffic light structure.

In another aspect, methods of displaying traffic signals are described herein which, in some embodiments, may provide one or more advantages over previous methods of displaying traffic signals. In some cases, for instance, a method of displaying traffic signals described herein can provide drivers with a secondary set of traffic signals that may be more visible to some drivers than a primary set of traffic signals, wherein the secondary set of traffic signals repeats or matches the primary set of traffic signals.

In some embodiments, a method of displaying traffic signals comprises displaying a first traffic signal in a first traffic light structure and simultaneously displaying a second traffic signal in a second traffic light structure below the first traffic light structure. In addition, the second traffic signal can be the same type of traffic signal as the first traffic signal. For example, the second traffic signal and the first traffic signal can both be a "red" or "stop" signal. Moreover, in some cases, a method described herein can further comprise displaying a third traffic signal in the first traffic light structure and simultaneously displaying a fourth traffic signal in the second traffic light structure, wherein the fourth traffic signal is the same type of traffic signal as the third traffic signal. For example, the third traffic signal and the fourth traffic signal can both be a "green" or "go" signal. Further, a method described herein can also comprise displaying a fifth traffic signal in the first traffic light structure and simultaneously displaying a sixth traffic signal in the second traffic light structure, wherein the sixth traffic signal is the same type of traffic signal as the fifth traffic signal. For example, the fifth traffic signal and the sixth traffic signal can both be an "amber" or "caution" signal. Other configurations of first, second, third, fourth, fifth, and sixth traffic signals are also possible, including configurations for directing turning traffic as well as traffic traveling straight through an intersection. Thus, in some implementations, a method described herein can be used to display complex and multi-directional traffic signals in a safe and highly visible manner.

The first and second traffic light structures of a method described herein can have any configuration described herein for a traffic signaling apparatus. For instance, in some cases, the second traffic light structure is at least three feet below the first traffic light structure. Moreover, in some instances, the first traffic light structure and the second traffic light structure are substantially horizontally aligned. Additionally, in some embodiments, the first traffic light structure is attached by a pole to the second traffic light structure or to a substantially horizontal mast arm, and the second traffic light structure is attached to the same mast arm or to a substantially horizontal cable.

Moreover, in some cases, the first traffic light structure of a method described herein is operable to display a single traffic signal. For example, in some embodiments, the single traffic signal is a first red signal, and the second traffic signal simultaneously displayed by the second traffic light structure is a second red signal. In some such instances, the method can further comprise displaying a green signal in the second traffic light structure, wherein the green signal is not simultaneously displayed in the first traffic light structure. Thus, in some cases, the first traffic light structure of a method described herein can be operable to display only one type of traffic signal simultaneously with the second traffic light structure. Moreover, in some embodiments, the first traffic light structure comprises a first signal light operable to display the first traffic signal, the second traffic light structure comprise a second signal light operable to display the second traffic signal, and the first signal light is larger than the second signal light.

These and other embodiments are described in greater detail in the detailed description which follows.

DETAILED DESCRIPTION

Figure 1A:
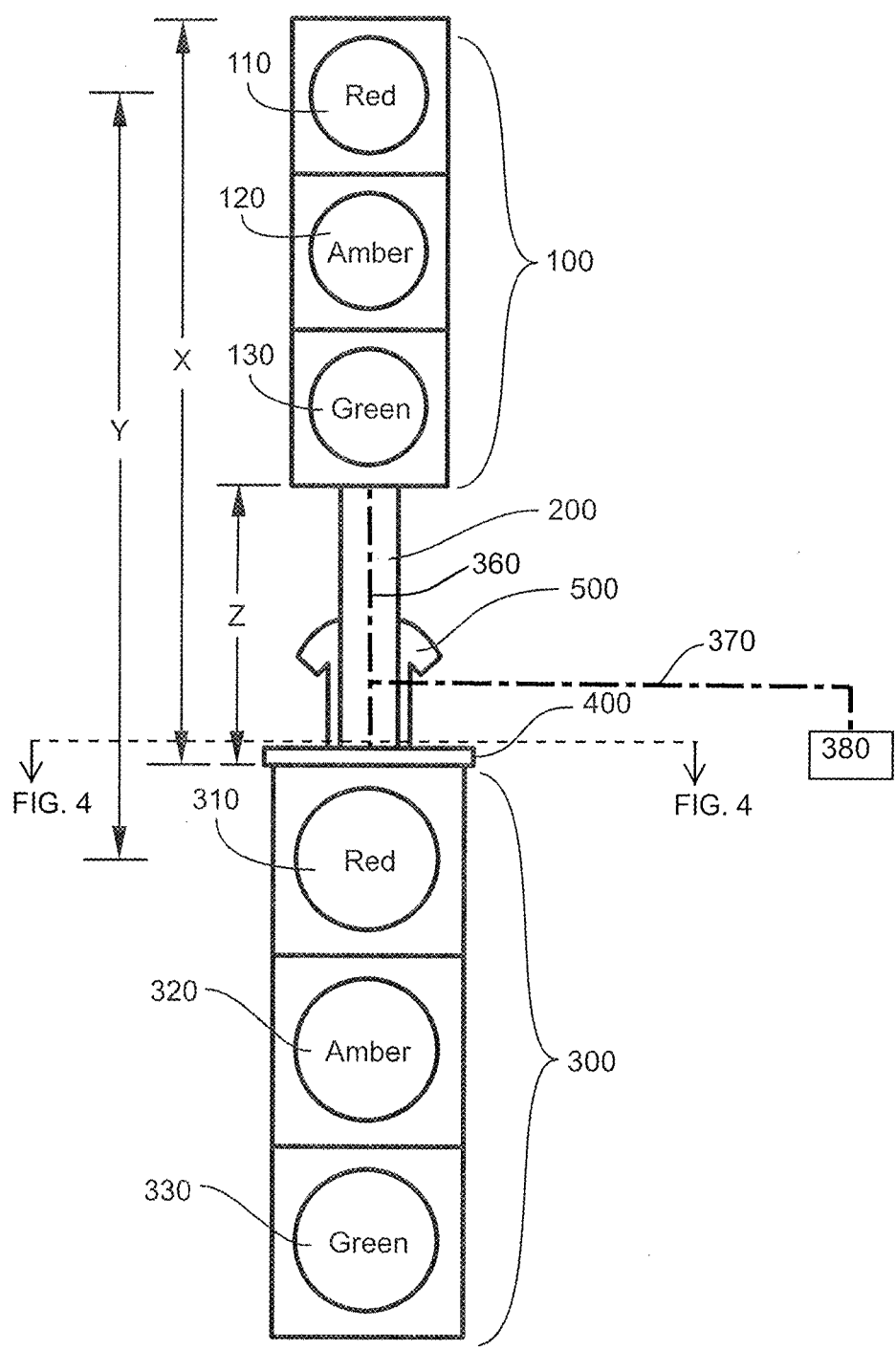
FIG. 1A illustrates a frontal view of a traffic signaling apparatus according to one embodiment described herein.

Embodiments described herein can be understood more readily by reference to the following detailed description and drawings. Elements, apparatus, and methods described herein, however, are not limited to the specific embodiments presented in the detailed description and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a disclosed range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

I. Traffic Signaling Apparatus

In one aspect, traffic signaling apparatus are described herein. In some embodiments, a traffic signaling apparatus described herein comprises a first traffic light structure and a second traffic light structure, the second traffic light structure being attached to a horizontal or substantially horizontal cable or a horizontal or substantially horizontal mast arm. The first traffic light structure is attached to the second traffic light structure or the mast arm by a pole. For example, in some cases, a traffic signaling apparatus described herein comprises a first traffic light structure and a pole attached to the first traffic light structure, wherein the pole is configured to attach the first traffic light structure to a second traffic light structure in a stacked configuration, and wherein the first traffic light structure is operable to simultaneously display the same traffic signals as displayed by the second traffic light structure.

A "stacked" configuration, for reference purposes herein, is a configuration in which one traffic light structure is disposed above the other traffic light structure in the vertical dimension, as opposed to being disposed, for example, beside the other traffic light structure in the horizontal dimension to provide a lateral configuration of the first and second traffic light structures.

In some embodiments, the first and second traffic light structures can also be substantially horizontally aligned. A "substantially horizontally aligned" configuration indicates that the first and second traffic lights are less than two feet, less than one foot, or less than 6 inches offset in a horizontal direction, such as a direction to the right or left. Further, it is to be understood that in a substantially horizontally aligned configuration, a first traffic light structure can be disposed in front of, behind, above, or below the second traffic light structure. Substantial horizontal alignment of traffic light structures described herein, in some embodiments, can reduce confusion of drivers entering an intersection as to which traffic light structures are displaying corresponding signals.

Further, a "substantially" horizontal mast arm or cable, as used herein, refers to a mast arm or cable that is disposed in a generally horizontal manner, as opposed to a generally vertical manner. Thus, in some cases, a "substantially" horizontal mast arm or cable is disposed at an angle less than about 45 degrees, less than about 30 degrees, less than about 15 degrees, less than about 10 degrees, or less than about 5 degrees from horizontal. However, it is to be understood that a portion of a "substantially" horizontal mast arm or cable may form some other angle with the horizontal, such that the mast arm or cable has an overall arcuate shape, provided that the mast arm or cable is disposed in a generally horizontal manner.

A "simultaneous" display of a plurality of traffic signals, for reference purposes herein, is a display of the traffic signals at the same time or substantially the same time from the perspective of a human observer, such that the ordinary human observer would perceive any change of the traffic signals at the same time and without a noticeable delay between the change of a first traffic signal and the change of a second traffic signal. For instance, in some embodiments, simultaneously displayed traffic signals are displayed within about 100 ms or less or within about 50 ms or less of one another. In some cases, simultaneously displayed traffic signals are displayed within about 30 ms or less, within about 20 ms or less, or within about 10 ms or less of one another.

Displaying the "same traffic signals," for reference purposes herein, means that the signals displayed simultaneously by the first and second traffic light structures provide the same information or instructions to drivers. For example, a first traffic signal displayed by a first traffic light structure and a second traffic signal displayed by a second traffic light structure may both be green "go" lights indicating that it should be safe for a driver to enter an intersection. In another instance, a first traffic signal displayed by a first traffic light structure and a second traffic signal displayed by a second traffic light structure may both be flashing yellow or amber "caution" lights indicating that the traffic signaling apparatus is not working properly and/or that special caution is required for some other reason. Further, a first traffic signal displayed by a first traffic light structure and a second traffic signal displayed by a second traffic light structure may both be red "stop" lights indicating that it is not safe for a driver to enter an intersection. However, it is to be understood that the size, shape, or other characteristic of the first and second traffic signals may or may not be the same, provided both signals provide the same information or instructions to drivers.

A traffic signaling apparatus described herein, in some embodiments, further comprises one or more other components, such as electrical wiring extending from the first traffic light structure of the traffic signaling apparatus and toward a second traffic light structure, and/or electrical wiring extending from a location external to both of the first and second traffic light structures to the respective structures, one or more wireless communication or signaling components, one or more counterweights, or one or more connection or attachment components such as one or more attachment plates or hangers, as described further hereinbelow.

Turning now to specific components of traffic signaling apparatus, traffic signaling apparatus described herein, in some embodiments, comprise a first traffic light structure that can be attached to at least one second traffic light structure. In some cases, the second traffic light structure is itself part of the traffic signaling apparatus. Alternatively, in other cases, the second traffic light structure is not itself part of the traffic signaling apparatus but can instead be attached to the traffic signaling apparatus in a manner described herein. Further, in some embodiments, the first traffic light structure is attached to a mast arm in place of, or in addition to, attachment to the second traffic light structure. The second traffic light structure, in general, can be attached to a cable or a mast arm.

The first and/or second traffic light structures of a traffic signaling apparatus described herein can have any structure or configuration not inconsistent with the objectives of the present invention. In some embodiments, for example, a traffic light structure described herein comprises an automotive roadway traffic light having a structure or configuration that complies with the current Manual on Uniform Traffic Control Devices (MUTCD) issued by the Federal Highway Administration of the United States Department of Transportation, the entirety of which is hereby incorporated by reference. In some embodiments, a traffic light structure described herein has one light, including a green light or a red light. In some instances, a traffic light structure described herein has at least two lights, including at least one green light and at least one red light. In other cases, a traffic light structure has at least three lights, including at least one green light, at least one yellow or amber light, and at least one red light. Moreover, a light of a traffic light structure described herein can be a round or circular light, or an arrow-shaped light, as needed or desired for a specific roadway intersection or other traffic context. Other shapes may also be used. A "signal light" or "light," as used herein, refers to a single signaling assembly configured or adapted to provide a contiguous light signal, which stands in contrast to an individual light bulb or light source. A "signal light" or "light" may refer to an individual light bulb or to an array of bulbs, LEDs, or other light emission structures adapted for such purposes. In general, any combination of traffic or signal light number, color, size, and shape not inconsistent with the objectives of the present invention can be used in a traffic light structure described herein. In some cases, for instance, one or more signal lights of a traffic light structure described herein has a diameter or maximum width of about 8 inches to 12 inches. Other sizes may also be used.

In addition, the first and second traffic light structures of a traffic signaling apparatus described herein can have the same size, shape, and/or construction, or differing sizes, shapes, and/or constructions. For example, in some embodiments, the first and second traffic light structures have substantially the same shape and are both formed from the same materials, such as plastic and/or metal, but have differing sizes. In some cases, the first traffic light structure is smaller and/or lighter than the second traffic light structure. In other cases, the first traffic light structure is larger than the second traffic light structure. Moreover, as described further hereinbelow, it is also possible for the first traffic light structure to be associated with more than one second traffic light structure. In such embodiments, the plurality of second traffic light structures may have the same or differing sizes, shapes, and/or constructions as one another.

A traffic signaling apparatus described herein, in some embodiments, also comprises a pole. In some cases, the pole is attached to the first traffic light structure and is configured to attach the first traffic light structure to one or more second traffic light structures in a stacked configuration. Alternatively, in other instances, the pole can be configured to attach the first traffic light structure to a mast arm, as described further hereinbelow. The pole can have any size, shape, or construction not inconsistent with the objectives of the present invention. In some embodiments, for instance, the pole is formed from a relatively strong and/or lightweight material, such as a metal such as aluminum, a plastic such as PVC, a composite material, or a combination thereof. Other materials may also be used. In some cases, the pole of a traffic signaling apparatus described herein has a round cross-section such as a circular or oval cross-section. In other instances, the pole has a polygonal cross-section such as a square, rectangular, or hexagonal cross-section. Further, the pole can be a hollow pole or a solid pole. In some cases, the pole can also be at least partially threaded to facilitate attachment of the pole to a first and/or second traffic light structure and/or to a horizontal mast arm. The pole of a traffic signaling apparatus described herein can also have a straight, tubular shape or a bent or curved shape, such as an elbowed shape or an S-shape.

The pole of a traffic signaling apparatus described herein can also have any desired diameter and/or length not inconsistent with the objectives of the present invention. In some embodiments, for instance, the length of the pole is at least about 2 feet, at least about 3 feet, such as about 2.5 feet to about 10 feet, about 3 feet to about 10 feet, about 3 feet to about 6 feet, about 3 feet to about 7 feet, about 3 feet to about 8 feet, about 3.5 feet to about 10 feet, about 3.5 feet to about 7 feet, about 3.5 feet to about 8 feet, or about 3.5 feet to about 6 feet. In addition, in some embodiments, the pole of a traffic signaling apparatus described herein has an adjustable length. For example, in some cases, the pole is formed from a plurality of pole segments which can be configured to overlap with one another by differing amounts as desired by a user to achieve an overall, total length of the pole. Such a pole, in some instances, can be a telescoping pole or a pole having interlocking segments which can be locked in place, such as by means of one or more rails, collars, sleeves, slots, anchors, bolts, screws, pegs, buttons, protrusions, or a combination thereof. In addition, in some cases, a pole of an apparatus described herein can be configured or adapted to provide a vertical spacing between the first traffic light structure and the second traffic light structure of the apparatus, as described further hereinbelow.

Moreover, a traffic signaling apparatus described herein, in some embodiments, further comprises electrical wiring (e.g., 360 and 370, FIG. 1A). In some cases, the electrical wiring extends from the first traffic light structure of the traffic signaling apparatus and toward a second traffic light structure. Alternatively, in other instances, electrical wiring can extend from a power source or other location external to both of the first traffic light structure and the second traffic light structure, and can connect to the traffic light structures individually. Any electrical wiring not inconsistent with the objectives of the present invention may be used. The wiring can be operable to establish an electrical connection between the first traffic light structure and the second traffic light structure or between the external power/signal source and the first and second traffic light structures, respectively. For example, the wiring can comprise one or more jumper wires. A jumper wire, in some cases, can be connected on one end of the wire to a circuit or other electrical component associated with the activation of a traffic light of the first traffic structure, and on the other end to a circuit or other electrical component associated with the activation of a corresponding traffic light of the second traffic structure. Thus, a particular jumper wire extending between the first traffic light structure and the second traffic light structure can allow a single control box or other controller (e.g., 380, FIG. 1A) to send the same signal or command to both the first and second traffic light structures simultaneously. For example, a signal or command for the green light of the traffic light structure to illuminate or stop illuminating could be sent simultaneously or substantially simultaneously to both the first and second traffic light structures. Further, electrical wiring extending between the first and second traffic light structures can comprise additional jumper wires having an analogous configuration with respect to other lights, such as the yellow lights or the red lights of the first and second traffic light structures. In this manner, the electrical wiring can permit or enable the simultaneous display of the same traffic signals by both the first traffic light structure and the second traffic light structure. Moreover, in some embodiments, the first traffic light structure may be configured to receive a traffic signal from the second light structure (or vice versa), such that the traffic signal is displayed by the first and second traffic light structures in series or in a repeating fashion. Further, in some cases, electrical wiring of a traffic signaling apparatus described herein is disposed within the pole connected to the first traffic light structure, such as when a hollow pole is used. In this manner, the pole can be used to protect the electrical wiring from various environmental conditions. Other configurations of electrical wiring can also be used, as understood by one ordinary skill in the art.

Figure 6:
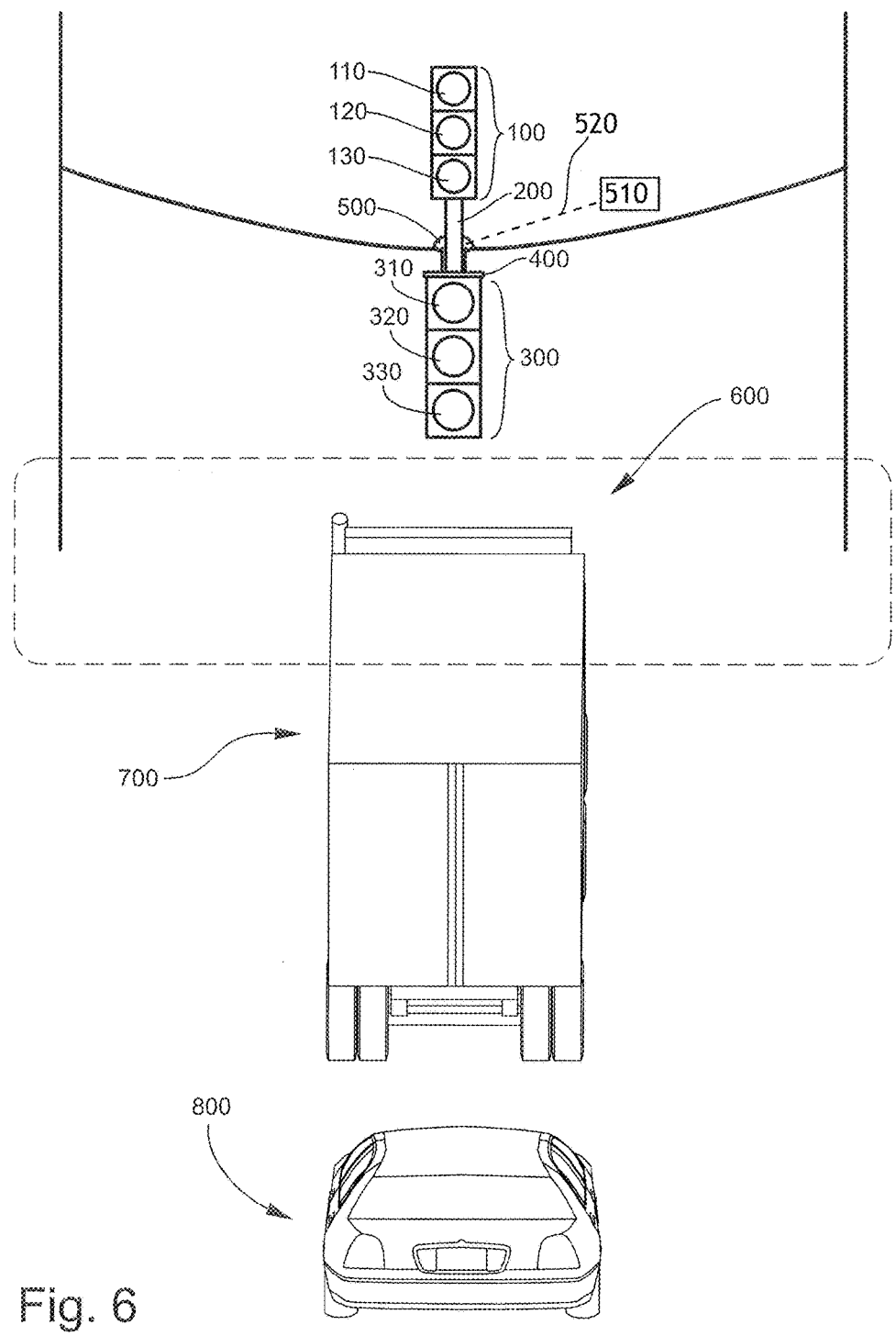
FIG. 6 illustrates a perspective view of a traffic signaling apparatus according to one embodiment described herein in operation in a traffic environment.

Further, in some embodiments, a traffic signaling apparatus described herein can comprise one or more wireless communication or signaling components (e.g., 510 in FIG. 6). Any wireless communication or signaling components not inconsistent with the objectives of the present invention may be used. In some cases, one or more wireless signaling or communication components can be used in addition to or instead of electrical wiring described herein to permit a traffic signaling apparatus or a traffic light structure to receive, relay, and/or display a traffic signal, including in a simultaneous manner described herein. Thus, in some embodiments, one or more signaling components, such as one or more computerized controllers (e.g., 510 in FIG. 6), can be in wireless communication (e.g., 520 in FIG. 6) with the first and/or second traffic light structure to provide simultaneous display of traffic signals described herein. Moreover, other configurations and methods for simultaneously displaying traffic signals and/or electrically connecting or putting first and second traffic light structures in signal communication with one another are also possible, as understood by one of ordinary skill in the art.

Additionally, in some embodiments, a traffic signaling apparatus described herein comprises at least one counterweight. Further, one or more counterweights can be configured to maintain the first traffic light structure in a desired position, such as a substantially vertical position and/or a position above the second light traffic structure. A "substantially" vertical position, for reference purposes here, comprises a position within about 15 degrees, within about 10 degrees, or within about 5 degrees of a position normal to the ground. A counterweight of a traffic signaling apparatus described herein can be formed of any material, have any weight, and be positioned in any configuration on the traffic signaling apparatus not inconsistent with the objectives of the present invention.

Figure 1B:
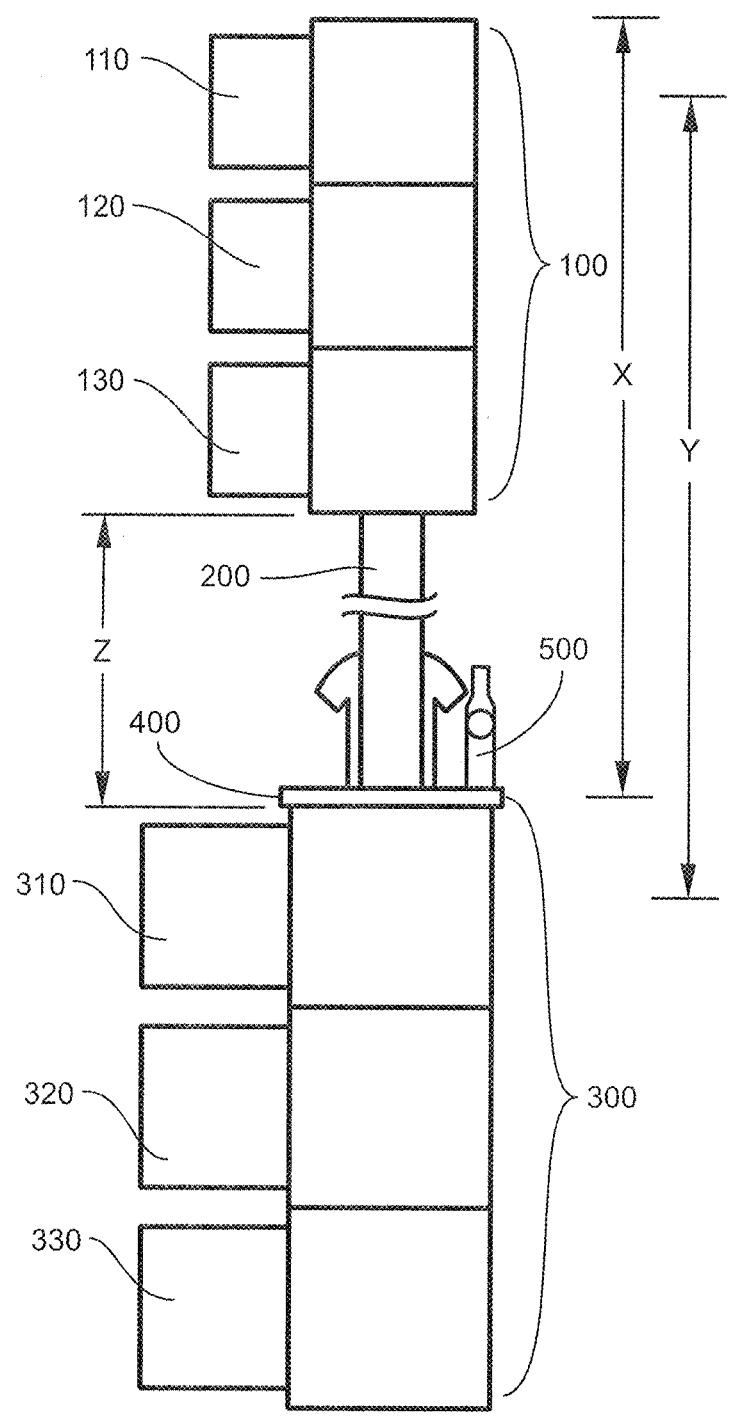
FIG. 1B illustrates a side view of the traffic signaling apparatus of FIG. 1A.
Figure 7:
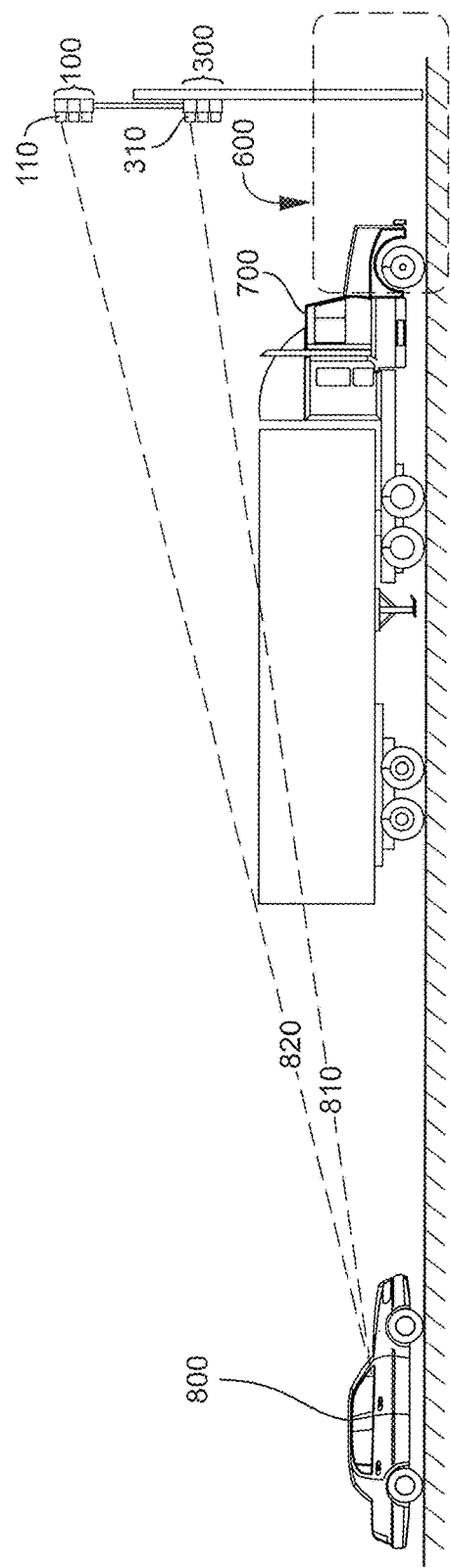
FIG. 7 illustrates a side view of a traffic signaling apparatus according to one embodiment described herein in operation in a traffic environment.

Some embodiments of traffic signaling apparatus will now be further described with reference to the drawings. FIGS. 1A and 1B illustrate a traffic signaling apparatus according to one embodiment described herein. The traffic signaling apparatus of FIGS. 1A and 1B comprises a first traffic light structure (100) and a pole (200) attached to the first traffic light structure (100). The pole (200) attaches the first traffic light structure (100) to a second traffic light structure (300). Both the first and second traffic light structures (100, 300) can be used to display traffic signals for directing the flow of traffic in an intersection, as illustrated in FIGS. 6 and 7. In the embodiment of FIGS. 1A and 1B, the first traffic light structure (100) comprises three traffic lights (110, 120, 130) arranged in a column or stacked configuration, and the second traffic light structure (300) also comprises three traffic lights (310, 320, 330) arranged in a column or stacked configuration. The traffic light structures (100, 300) each have a red light (110, 310) on top, a yellow or amber light (120, 320) in the middle, and a green light (130, 330) on the bottom. The traffic lights (110, 120, 130, 310, 320, 330) can be used to provide information or instructions to drivers of automobiles approaching an intersection, as described further herein. Alternatively, the first traffic light structure (100) can be connected to a horizontal mast arm (not shown) as described further hereinbelow. However, as understood by one of ordinary skill in the art, other configurations of traffic lights are also possible, as shown in FIGS. 2A, 2B and 3, for instance.

Figure 2A:
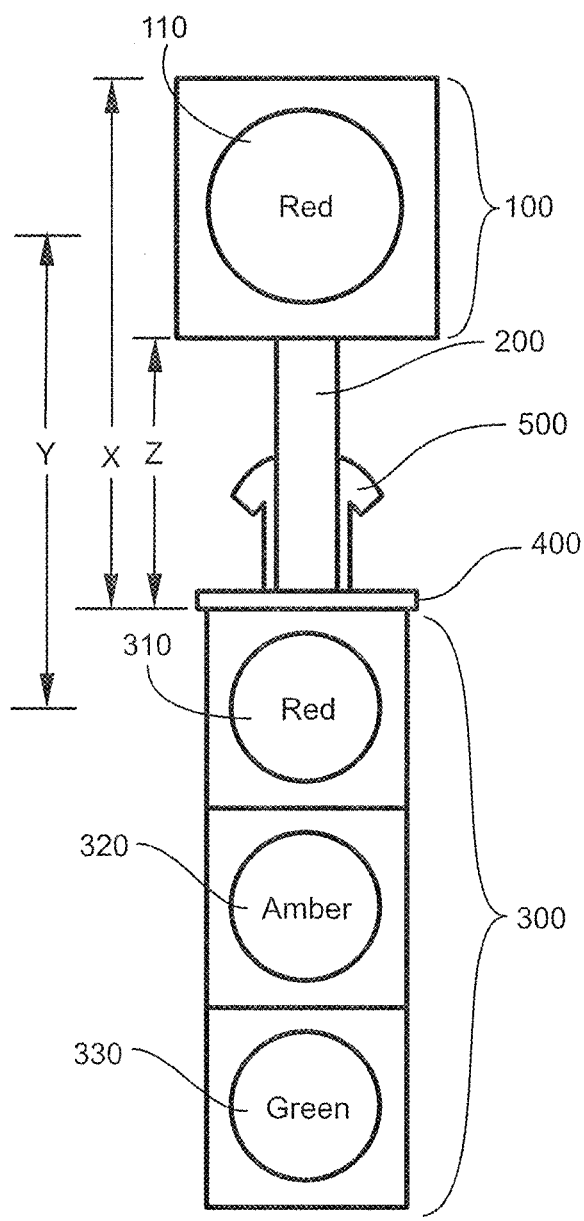
FIG. 2A illustrates a frontal view of a traffic signaling apparatus according to one embodiment described herein.
Figure 2B:
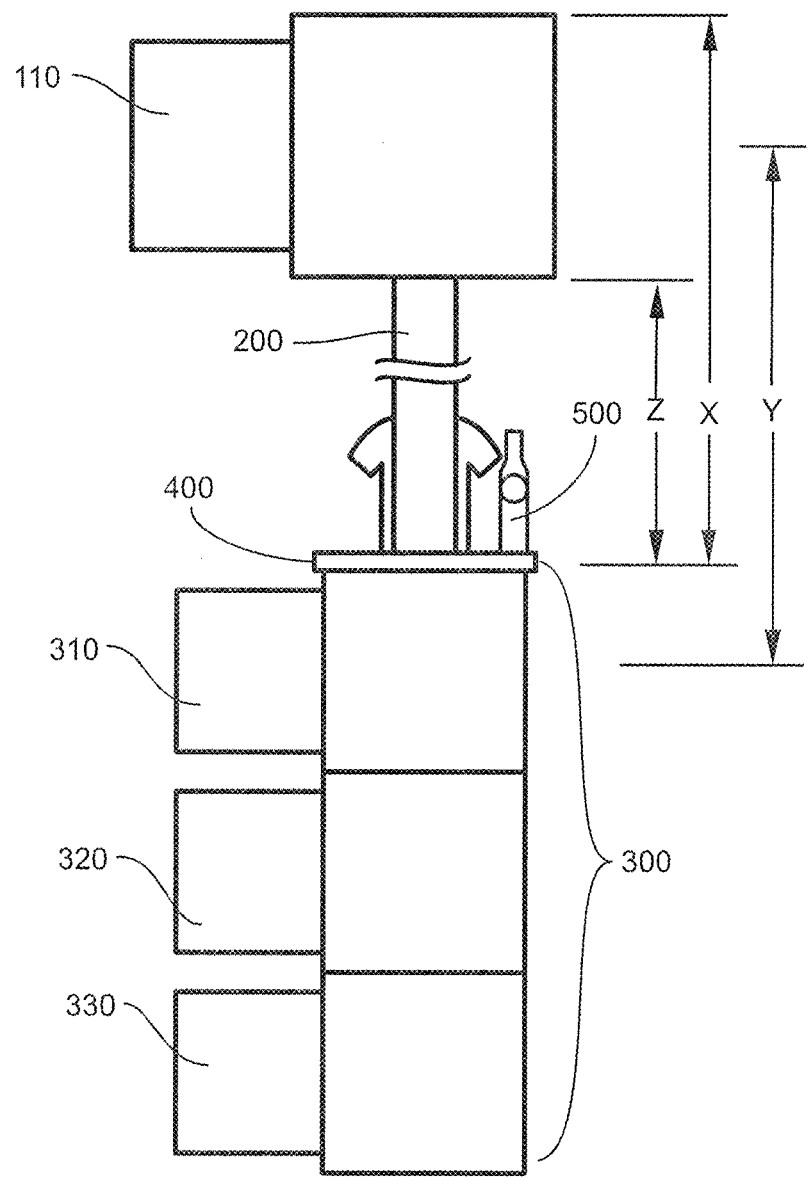
FIG. 2B illustrates a side view of the traffic signaling apparatus of FIG. 2A.

In the embodiment of FIGS. 2A and 2B, the first traffic light structure (100) can have a single signal light, such as a red light (110), and can be attached to a pole (200). The pole (200) can attach the first traffic light structure (100) to the second traffic light structure (300) or, as described further hereinbelow, to a horizontal mast arm (not shown). The single signal light, such as the red light (110), can be operable to simultaneously display a traffic signal displayed by the second traffic light structure (300), such as a red "stop" light produced by the red light (310) of the second traffic light signal. In some embodiments, the single signal light or red light (110) is smaller than the signal lights of the second traffic light structure (300), such as the red, amber, or green lights (310, 320, 330). In other cases, the single signal light or red light (110) is the same size or larger than the signal lights of the second traffic light structure (300), such as the red, amber or green lights (310, 320, 330). For example, in some instances, the single signal light (110) has a diameter of about 12 inches, and the red light (310) has a diameter of about 8 inches. In embodiments wherein the first red signal light (110) is larger than the second red signal light (310), visibility of the stop signal may be increased for a driver entering the intersection.

Figure 3:
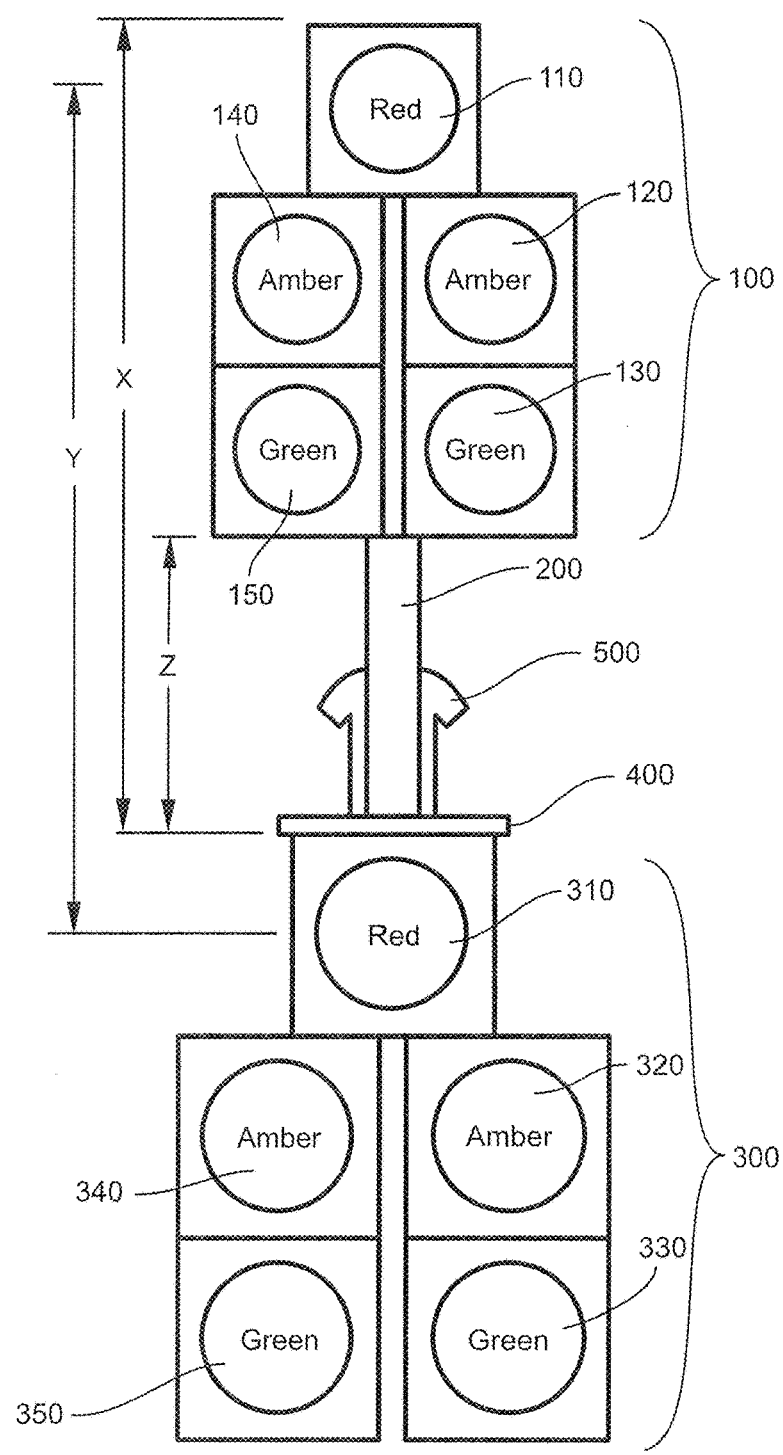
FIG. 3 illustrates a frontal view of a traffic signaling apparatus according to one embodiment described herein.

In the embodiment of FIG. 3, the first and second traffic light structures (100, 300) include traffic lights (110, 120, 130, 140, 150, 310, 320, 330, 340, 350) that can be used for more complex traffic patterns, including patterns comprising multiple lanes of traffic approaching or passing through an intersection from the same direction. In such an embodiment, one or more of the traffic lights of the same type (e.g., green) in the same traffic light structure can be illuminated in tandem. For example, both of the green lights (330, 350) could be illuminated together, such as when two lanes of traffic are directed by the same traffic light structure. Alternatively, in other cases, a first green light (330) could be a solid or "straight" green light, and a second green light (350) could be a left turn arrow green light. In such instances, the two green lights (330, 350) may or may not be illuminated separately or in tandem. Other patterns of traffic lights are also possible, and any combination of lights not inconsistent with the objectives of the present invention may be used.

In the embodiments of FIGS. 1A, 1B, 2A, 2B and 3, the first traffic light structure (100) and the second traffic light structure (300) are connected or attached to one another by a pole (200). However, as described further hereinbelow, it is to be understood that the first traffic light structure (100) can be attached to a mast arm in place of, or in addition to, being attached to the second traffic light structure (300). As described herein, the pole (200) can have a length adapted to provide a desired total height of the first traffic light structure (100) and/or a desired height of one or more traffic lights (110, 120, 130) above an intersection or above one or more traffic lights (310, 320, 330) of the second traffic light structure (300). For example, the total height of the first traffic light structure (100) and/or one or more traffic lights (110, 120, 130) can have a value X. In some cases, X can have a value greater than about 3 feet, greater than about 5 feet, greater than about 7 feet, or greater than about 10 feet. In some embodiments, X can have a value between about 3 feet and about 12 feet, between about 5 feet and about 12 feet, or between about 6 feet and about 10 feet. In addition, a first traffic light (110) within the first traffic light structure (100) can be disposed a certain distance above a first traffic light (310) within the second traffic light structure (300),
wherein the distance can have a value Y. In some cases, Y can have a value greater than about 3 feet, greater than about 5 feet, greater than about 7 feet, or greater than about 10 feet. In some embodiments, Y can have a value between about 3 feet and about 12 feet, between about 5 feet and about 12 feet, or between about 6 feet and about 10 feet. Further, the first traffic light structure (100) can be disposed at a distance Z above the second traffic light structure (300). In some cases, Z can have a value greater than about 2 feet, greater than about 2.5 feet, greater than about 3 feet, greater than about 5 feet, greater than about 7 feet, or greater than about 10 feet. In some embodiments, Z can have a value between about 2.5 feet and about 10 feet, between about 3 feet and about 12 feet, between about 3 feet and about 6 feet, between about 5 feet and about 12 feet, or between about 6 feet and about 10 feet.

Moreover, as illustrated in FIG. 1B, the pole (200) can also have a shape or other configuration adapted to permit the placement of the first traffic light structure (100) in a stacked configuration centered above the second traffic light structure (300), wherein the "centered" configuration can be in a front-back dimension and/or a left-right dimension. Such a configuration, in some cases, can provide improved stability to a traffic signaling apparatus described herein, particularly for embodiments wherein at least a portion of the traffic signaling apparatus is suspended from or attached to a cable or wire. Further, the first traffic light structure (100) can be substantially horizontally aligned with the second traffic light structure (300), whether attached by the pole to the second traffic light structure (300) or to a horizontal mast arm. In the embodiment illustrated in FIG. 1B, the pole (200) is represented in a manner intended to indicate that the pole (200) can be of any length consistent with the present invention, and that bends, turns, or other pole (200) configurations are contemplated within the illustration of FIG. 1B.

Additionally, as described herein, the pole (200) may be configured to removably attach to the first traffic light structure (100) and/or the second traffic light structure (300) in a modular and/or facile manner, such that the pole (200) can be repeatedly attached to or removed from the first and/or second traffic light structure (100, 300) in a rapid and/or convenient manner, as needed or desired by a user. Such a modular configuration can provide ease of interchangeability or repair of one or more components of a traffic signaling apparatus described herein and may be particularly useful when a traffic signaling apparatus comprising a first traffic light structure attached to a pole as described herein is used to upgrade or retrofit a previously existing second traffic light structure.

Figure 4:
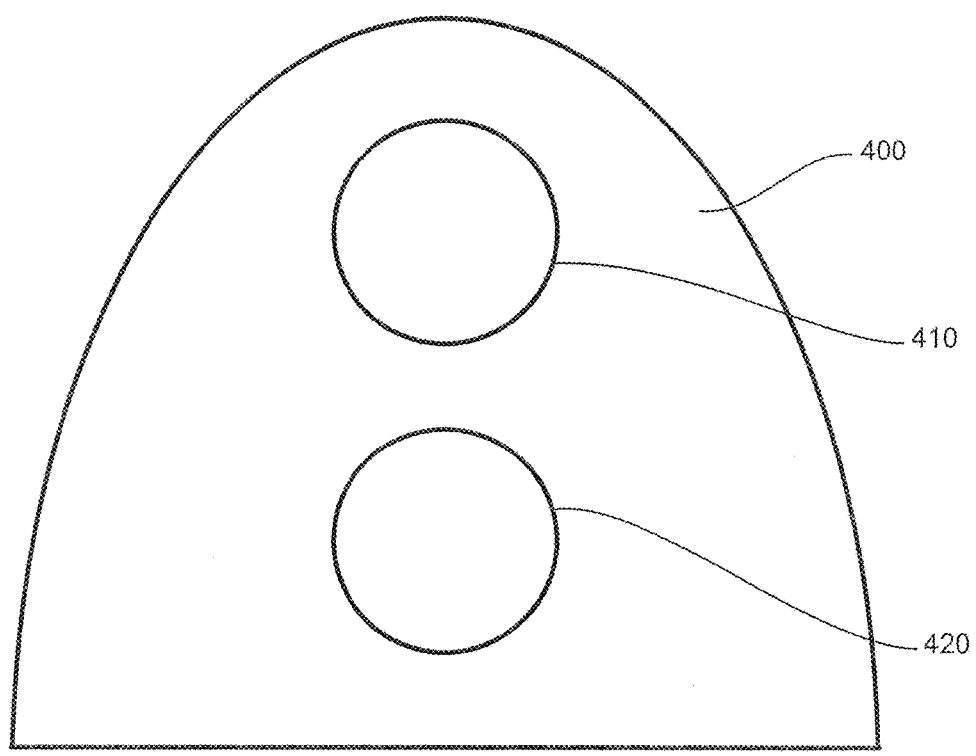
FIG. 4 illustrates a top view of an attachment plate configured to attach a first traffic light structure to a second traffic light structure according to one embodiment of a traffic signaling apparatus described herein.

In some embodiments, the pole (200) of a traffic signaling apparatus can be attached to a second traffic light structure (300) using an attachment plate (400), which may or may not be part of the second traffic light structure (300). For example, as illustrated in FIGS. 1A, 1B, 2A, 2B, and 3, an attachment plate (400) can form the top of the second traffic light structure (300) and can be adapted to attach the first traffic light structure (100) and the pole (200) to the second traffic light structure (300). The attachment plate (400) can have any configuration for this purpose not inconsistent with the objectives of the present invention. For example, in the embodiment of FIG. 4, the attachment plate (400) has a semi-elliptical shape that corresponds to the top of a second traffic light structure and further comprises a plurality of cavities, conduits, or connectors (410, 420) for receiving the pole (200) and/or another component of the traffic signaling apparatus, such as a hanger (500). The diameter of the cavities, conduits, or connectors (410, 420) can vary to accommodate a variety of shapes and sizes of pole (200) and/or hanger (500). Other configurations of an attachment plate (400) are also possible. For example, the attachment plate (400) of a traffic signaling apparatus described herein may also be formed in a square, rectangle, circle, semicircle, or other shape and/or include other structures for receiving or attaching the pole (200), such as one or more clamping mechanisms, slots, sleeves, or threaded holes for receiving a threaded pole, bolt, screw, or other threaded attachment member.

The hanger (500) of a traffic signaling apparatus described herein, in some embodiments, can be configured to attach the second traffic light structure (300) or the entire traffic signaling apparatus to a cable or power line structure for use in a traffic context, as illustrated in FIGS. 6 and 7 and described further herein below. For example, the hanger (500) can be used to suspend or otherwise attach or affix the traffic signaling apparatus to a substantially horizontal cable, line, pole, or other support structure for placement of the apparatus above the intersection of a roadway. Further, in some instances, the hanger (500) can also permit the first and second traffic light structures (100, 300) to be attached electrically to a power grid and/or a traffic light controller or other traffic signal origination source (not shown).

Moreover, in some embodiments, a traffic signaling apparatus described herein can further comprise one or more counterweights (not shown). The counterweights can be positioned to help maintain a desired orientation of one or more components of the traffic signaling apparatus. For example, in some cases, one or more counterweights can be used to counterbalance the weight of a first traffic light structure (100) attached to and positioned above a second traffic light structure (300) in a stacked configuration, including for the purpose of maintaining the first and/or second traffic light structure (100, 300) in a vertical or substantially vertical orientation. In one non-limiting example, for instance, the second traffic light structure (300) may have affixed to it a counterweight in order to prevent or reduce tipping or swaying of the traffic signaling apparatus due to the weight and placement of the first traffic light structure (100).

Figure 5A:
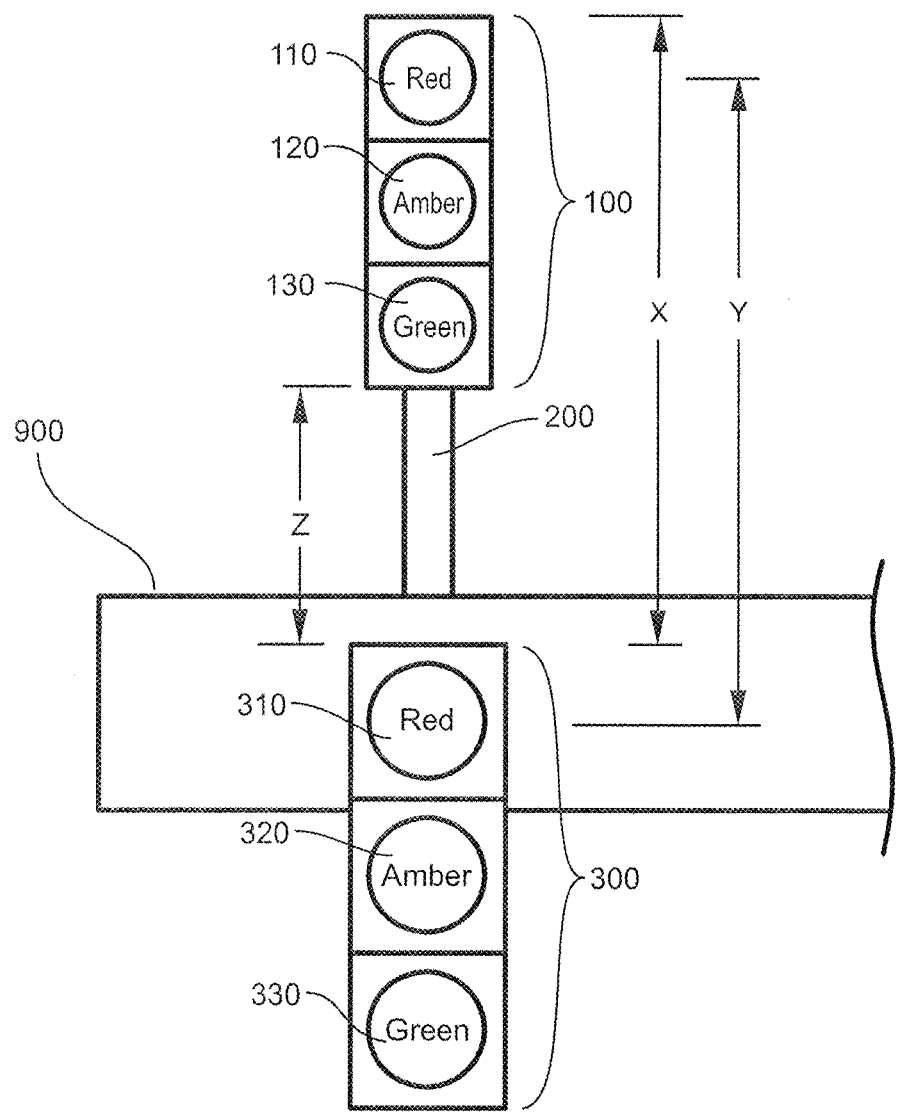
FIG. 5A illustrates a frontal view of a traffic signaling apparatus according to one embodiment described herein.
Figure 5B:
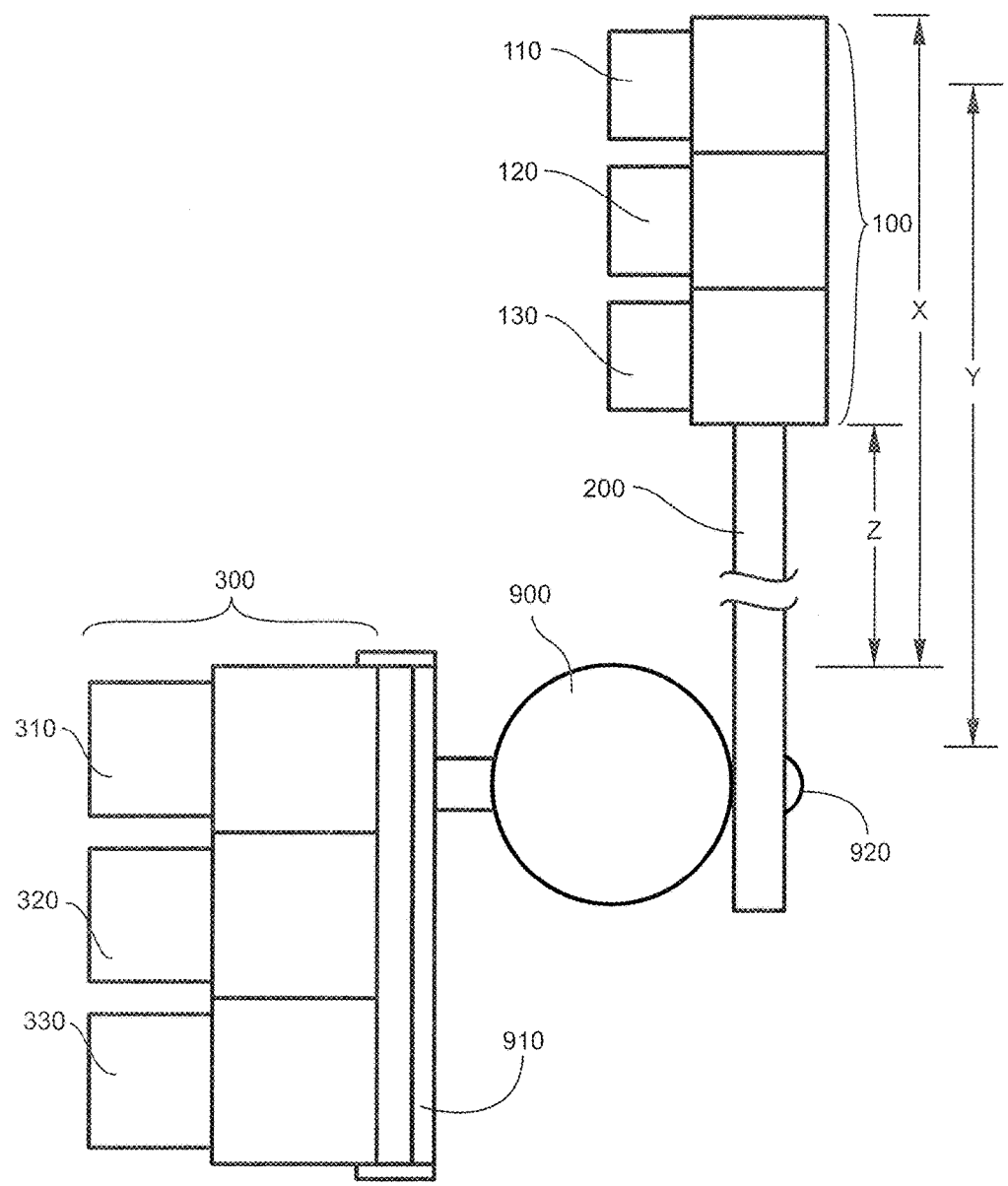
FIG. 5B illustrates a side view of the traffic signaling apparatus of FIG. 5A.

In addition to the foregoing embodiments, wherein the first traffic light structure (100) is attached to the second traffic light structure (300) by a pole (200), FIGS. 5A and 5B illustrate an embodiment wherein the first traffic light structure (100) is attached by a pole (200) to a horizontal mast arm (900). The second traffic light structure (300) is also attached to the horizontal mast arm (900). The first traffic light structure (100) and pole (200) can be attached to the horizontal mast arm (900) in any manner or by any means not inconsistent with the objectives of the present invention. For example, as illustrated in the side view of FIG. 5B, the pole (200) is attached by a fastener (920) to the horizontal mast arm (900). The fastener (920) illustrated in FIG. 5B is a bolt or pin, however other fasteners (920) are also contemplated, such as brackets, U-bolts, or the like. Similarly, the second traffic light structure (300) can be attached to the horizontal mast arm (900) in any manner or by any means not inconsistent with the objectives of the present invention. For example, in the embodiment of FIG. 5B, the second traffic light structure (300) is attached to a bracket (910), and the bracket (910) is attached to the horizontal mast arm (900). Other configurations may comprise or include a U-bolt, carrier bolt, locking bolt, pin, or other structure adapted to attach the second traffic light structure (300) to the horizontal mast arm (900). Further, as illustrated in FIGS. 5A and 5B, the pole (200) extends slightly below the mast arm (900), as much as 1-3 inches. In general, the pole (200) can extend to the bottom of the mast arm (900), beyond the bottom of the mast arm (900), or to a distance above the bottom of the mast arm (900), as desired by a user. Generally, the overlap of the pole (200) with the mast arm (900) can be selected to provide a desired number of attachment points to the mast arm (900) and/or to provide a desired extension of the pole (200) below the bottom of the mast arm (900). Similarly, as illustrated in FIGS. 5A and 5B, the pole (200) is attached to the bottom of the first light structure (100). However, it is also possible to attach the pole (200) to the back of the first light structure (100). In such an instance, the pole (200) may also extend above the top of the first light structure (100) by a desired distance. Such a configuration may provide additional attachment points, stability, and/or modularity to the traffic signaling apparatus. In addition, the configuration illustrated in FIGS. 5A and 5B is substantially horizontally aligned, in that the first traffic lights structure (100) is within 2 feet, within 1 foot, or within 6 inches of being directly above the second traffic light structure (300), despite being disposed on an opposing side of the mast arm (900). Other configurations are also possible. For example, in some cases, the first traffic light structure (100) can be above and beside the second traffic light structure (300), such that the first traffic light structure (100) and the second traffic light structure (300) are not horizontally aligned but are instead offset in the horizontal direction (the direction to the left or right in FIG. 5A and orthogonal to the plane of the page in FIG. 5B). The horizontal offset can be any distance not inconsistent with the objectives of the present disclosure. In some implementations, for instance, the first traffic light structure (100) and the second traffic light structure (300) are spaced apart in the horizontal direction by an amount up to about 5 feet or up to about 3 feet. Such a spacing distance can be measured as the distance between the center of the first traffic light structure (100) and the center of the second traffic light structure (300) in the horizontal direction.

Figure 8:
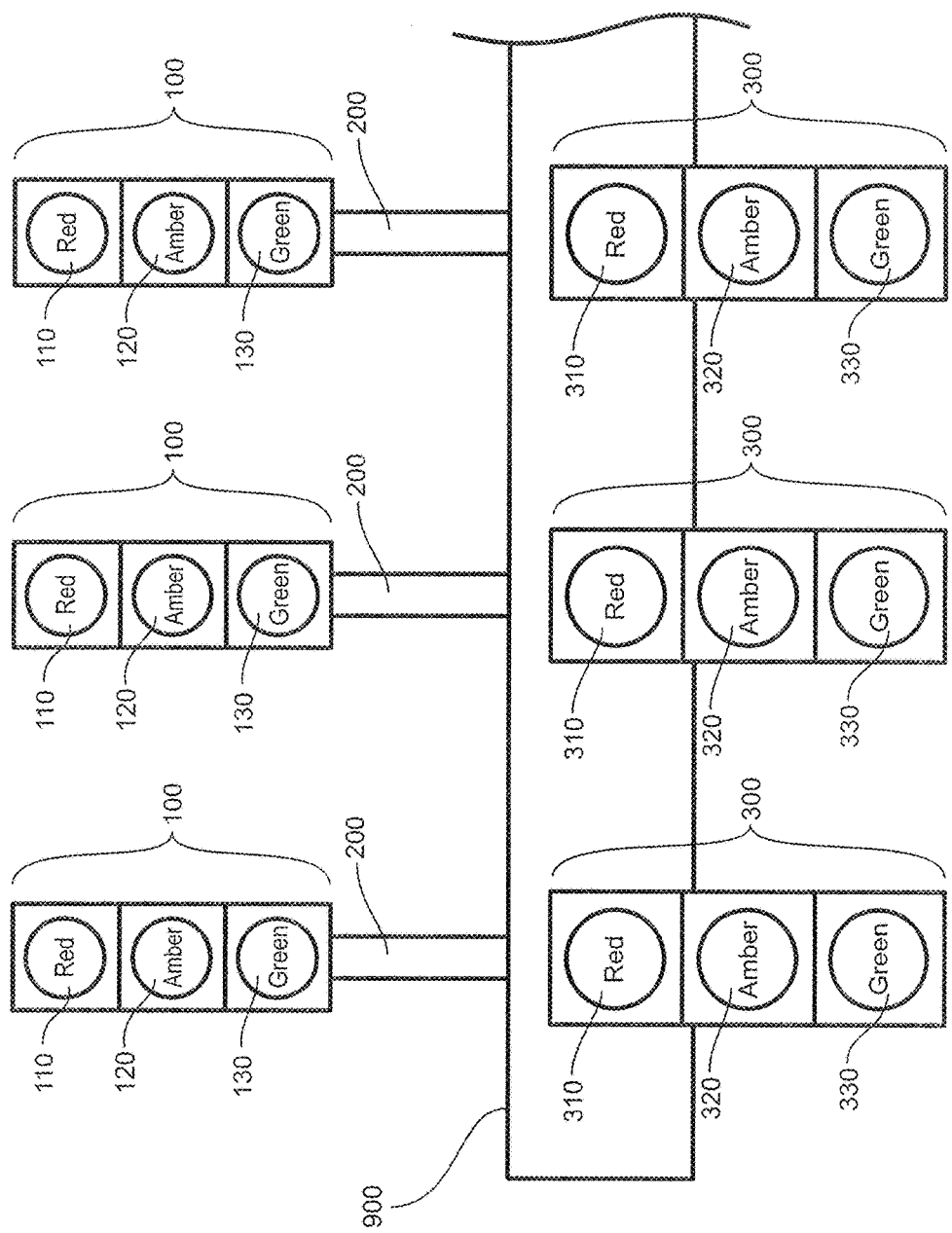
FIG. 8 illustrates a frontal view of a traffic signaling apparatus according to one embodiment described herein.

In addition, it is to be understood that any configuration of a traffic signaling apparatus described herein can also apply to more than one first traffic light structure and/or more than one second traffic light structure. For example, as illustrated in FIG. 8, a traffic signaling apparatus described herein, in some embodiments, can comprise a plurality of first traffic light structures (100) that correspond to and/or are configured to attach to a plurality of second traffic light structures (300). Further, in such an embodiment, the first traffic light structures (100) can be attached to and/or placed in electrical communication with the plurality of second traffic light structures (300) in any manner not inconsistent with the objectives of the present invention, including by means of a configuration described hereinabove. In the embodiment of FIG. 8, the first traffic light structures (100) and the second traffic light structures (300) can each be attached to a horizontal mast arm (900) in the manner illustrated in FIGS. 5A and 5B. Specifically, in the embodiment of FIG. 8, the first traffic light structures (100) and the poles (200) are attached to the horizontal mast arm (900) and are substantially horizontally aligned to corresponding second traffic light structures (300). However, other configurations are also possible. As illustrated in FIG. 8, each individual second traffic light structure (300) and the first traffic light structure (100) above it may correspond to an individual lane of traffic approaching the intersection (not shown). Thus, the number of first and second traffic light structures (100, 300) may vary based on the number of lanes approaching the intersection. Additionally, it is to be understood that the second traffic light structures (300) in FIG. 8 may display the same traffic signals at the same time, or may display differing signals from one another, provided that each first traffic light structure (100) simultaneously displays a traffic signal corresponding to a traffic signal displayed by the second traffic light structure (300) beneath it.

II. Methods of Displaying Traffic Signals

In another aspect, methods of displaying traffic signals are described herein. In some embodiments, a method of displaying traffic signals comprises displaying a first traffic signal in a first traffic light structure and simultaneously displaying a second traffic signal in a second traffic light structure below the first traffic light structure, wherein the second traffic signal is the same type of traffic signal as the first traffic signal. Moreover, in some cases, the method further comprises displaying a third traffic signal in the first traffic light structure and simultaneously displaying a fourth traffic signal in the second traffic light structure, wherein the fourth traffic signal is the same type of traffic signal as the third traffic signal. In addition, the method can further comprise displaying a fifth traffic signal in the first traffic light structure and simultaneously displaying a sixth traffic signal in the second traffic light structure, wherein the fifth traffic signal is the same type of traffic signal as the sixth traffic signal. In such cases, the first, third, and fifth traffic signals can be displayed sequentially in the first traffic light structure, such that only one of the signals is displayed at a time. Similarly, the second, fourth, and sixth traffic signals can be displayed sequentially in the second traffic light structure. For example, in some embodiments, the first and second traffic signals could be red lights or "stop" signals indicating that it is not safe for a driver to enter the intersection. The third and fourth traffic signals could be green lights or "go" signals indicating it should be safe for a driver to enter an intersection. The fifth and sixth traffic signals could be yellow lights or "caution" signals indicating that it will soon not be safe for a driver to enter the intersection. Additional pairs of traffic signals can also be displayed in the first and second traffic light structures in a similar manner, as needed or desired. A method of displaying traffic signals described herein, in some cases, can thus improve traffic safety by simultaneously providing two sets of identical traffic signals for drivers approaching an intersection. The set of signals displayed sequentially in the higher, first traffic light structure can, in some instances, be visible to a driver approaching the intersection under circumstances in which the set of signals displayed in the lower, second traffic light structure are not visible. For example, the set of signals displayed in the second traffic light structure may be obstructed by a tall vehicle described herein.

In other embodiments, the first traffic signal can be operable to display a single traffic signal, such as a first red light or "stop" signal. In such cases, the second traffic signal can be a second red signal. The second traffic light structure can be operable to display additional traffic signals, such as a green signal, green light, or "go" signal. The second traffic light structure can also display a yellow signal, yellow light, or "caution" signal.

A method of displaying traffic signals described herein can be carried out in any manner not inconsistent with the objectives of the present invention. In some embodiments, a method described herein is carried out using a traffic signaling apparatus described hereinabove in Section I. Thus, in some cases, the first and second traffic light structures of a method described herein can be the first and second traffic light structures of a traffic signaling apparatus of Section I. For example, in one embodiment, the traffic light structure comprises a first signal light operable to display a first traffic signal, the second traffic light structure comprises a second signal light operable to display the second traffic signal and the first signal light can be larger than the second signal light. Further, the second traffic light structure can be attached to a substantially horizontal cable or a substantially horizontal mast arm. The first traffic light structure can be attached to the second traffic light structure or the horizontal mast arm by a pole. Further, in some cases, the second traffic light structure is at least 3 feet below the first traffic light structure. Additionally, in some embodiments, the first and second traffic light structures are substantially horizontally aligned.

Referring again to the drawings, FIGS. 6 and 7 illustrate one embodiment of a traffic signaling apparatus described herein positioned above an intersection (600) for displaying traffic signals according to one embodiment of a method described herein. As illustrated in FIGS. 6 and 7, the first traffic light structure (100) can effectively extend the visibility of a traffic signal to a driver whose vision of the second traffic light structure (300) may be impaired by a large or tall vehicle (700), such as a commercial transport truck. Specifically, the driver of a following vehicle (800) approaching the intersection (600) behind the tall vehicle (700) may, at a particular distance from the intersection (600), have a first line of sight (810) between the driver and a red light (310) of the second traffic light structure (300) that is obstructed by the tall vehicle (700). However, the driver of the following vehicle (800) may also have a second line of sight (820) between the driver and a red light (110) of the first traffic light structure (100) that is not obstructed by the tall vehicle (700). Therefore, the driver of the following vehicle (800) may be provided with more time and information to make a safer driving decision than might otherwise be possible.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A traffic signaling apparatus comprising:
   a substantially horizontal mast arm;
   a plurality of first traffic light structures; and
   a plurality of second traffic light structures,
   wherein each of the plurality of second traffic light structures is attached to the substantially horizontal mast arm;
   wherein each of the plurality of first traffic light structures is attached by a pole to a corresponding second traffic light structure or to the substantially horizontal mast arm;
   wherein each of the first traffic light structures is substantially vertically aligned with the corresponding second traffic light structure;
   wherein each of the first traffic light structures is disposed at least three feet above the corresponding second traffic light structure;
   wherein each of the second traffic light structures is operable to display a red traffic signal and a green traffic signal; and wherein each of the first traffic light structures is operable to simultaneously display the red traffic signal displayed by the corresponding second traffic light structure.

2. The traffic signaling apparatus of claim 1, wherein each of the first traffic light structures is operable to simultaneously display the green traffic signal displayed by the corresponding second traffic light structure.

3. The traffic signaling apparatus of claim 1, wherein the first traffic light structures are spaced apart from each other along a horizontal length of the mast arm.

4. The traffic signaling apparatus of claim 3, wherein each of the first traffic light structures corresponds to a different individual lane of traffic, respectively, approaching an intersection associated with the traffic signaling apparatus.

5. The traffic signaling apparatus of claim 1 further comprising:
a computerized controller in signal communication with the first and second traffic light structures to provide simultaneous display of traffic signals by corresponding first and second traffic light structures.

6. The traffic signaling apparatus of claim 5, wherein the controller is in wireless communication with the first and/or second traffic light structures.

7. The traffic signaling apparatus of claim 5, wherein the controller is in wired communication with the first and/or second traffic light structures.

* * * * *